United States Patent
Shih-Lang

(10) Patent No.: US 7,918,140 B2
(45) Date of Patent: Apr. 5, 2011

(54) STRESS SENSOR AND ELECTRONIC DEVICE WITH SAME

(75) Inventor: Huang Shih-Lang, Taipei (TW)

(73) Assignee: Elan Microelectronics Corp., Hsinchu (TW)

( * ) Notice: Subject to any disclaimer, the term of this patent is extended or adjusted under 35 U.S.C. 154(b) by 36 days.

(21) Appl. No.: 12/177,225

(22) Filed: Jul. 22, 2008

(65) Prior Publication Data

US 2009/0241680 A1    Oct. 1, 2009

(30) Foreign Application Priority Data

Mar. 26, 2008   (TW) ................................ 97110673 A

(51) Int. Cl.
*G01B 7/16* (2006.01)
(52) U.S. Cl. ...................... 73/774; 73/862.627
(58) Field of Classification Search ............. 73/774, 73/862.627
See application file for complete search history.

(56) References Cited

U.S. PATENT DOCUMENTS

| 5,489,900 | A  | * | 2/1996  | Cali et al. ........................ 341/34 |
| 5,499,041 | A  | * | 3/1996  | Brandenburg et al. ........ 345/174 |
| 5,640,178 | A  | * | 6/1997  | Endo et al. ..................... 345/161 |
| 6,040,823 | A  | * | 3/2000  | Seffernick et al. ............. 345/168 |
| 6,359,613 | B1 | * | 3/2002  | Poole .............................. 345/161 |
| 7,040,182 | B2 | * | 5/2006  | Teraoka .................... 73/862.627 |
| 7,148,880 | B2 | * | 12/2006 | Magara .......................... 345/161 |
| 7,176,891 | B2 | * | 2/2007  | Inukai ............................ 345/161 |
| 2004/0130529 | A1 | * | 7/2004 | Magara .......................... 345/161 |
| 2005/0039549 | A1 | * | 2/2005 | Teraoka .................... 73/862.627 |

* cited by examiner

*Primary Examiner* — Freddie Kirkland, III
(74) *Attorney, Agent, or Firm* — WPAT., P.C.; Justin King

(57) ABSTRACT

The present invention relates to a stress sensor to be combined with an assembled object of an input unit of an electronic device. The stress sensor includes a circuit substrate and a pointing operation element disposed on a surface of the circuit substrate. The circuit substrate is combined with an assembled object of an input unit by a connecting mechanism such that the circuit substrate is directly attached onto a surface of the assembled object. As a result, the overall height of the stress sensor and the assembled object is reduced in comparison with the prior art.

9 Claims, 5 Drawing Sheets

STRESS SENSOR AND ELECTRONIC DEVICE WITH SAME

CROSS-REFERENCE TO RELATED APPLICATION

This application claims priority under 35 U.S.C. §119 to Taiwan Patent Application No. 097110673, filed on Mar. 26, 2008, in the Taiwan Intellectual Property Office, the entire contents of which are hereby incorporated by reference.

FIELD OF THE INVENTION

The present invention relates to a sensor and an electronic device with such a sensor, and more particularly to a stress sensor and an electronic device with such a stress sensor.

BACKGROUND OF THE INVENTION

A pointing stick with pointing capability is widely used in many types of electronic devices such as notebook computers, mice, keyboards, hand-held devices, joysticks and the like. In this context, the pointing stick is also referred as a stress sensor. Generally, the stress sensor cooperates with a hardware input structure of an electronic device to implement the pointing function. For example, the common stress sensor of a notebook computer is arranged among keys near the middle of the keyboard. When a user touches the stress sensor with a finger, an electronic signal indicative of the magnitude and the direction of the force exerted by the user will be generated. In response to the electronic signal, the stress sensor causes corresponding movement of the cursor on the display screen.

FIGS. 1A and 1B are schematic perspective and exploded views of a conventional stress sensor, respectively. FIG. 2 schematically illustrates a lower surface of a circuit substrate used in the conventional stress sensor. Hereinafter, the operation principles and the configuration of a conventional stress sensor will be illustrated with reference to FIGS. 1A, 1B and 2. The conventional stress sensor 10 principally comprises a back plate 11, a circuit substrate 12, a pointing operation element 13, a plurality of stress sensitive resistors 14, a fixing element 15 with a hollow portion 151 for penetrating the pointing operation element 13 therethrough, a plurality of fastening holes 161 and a plurality of fastening elements 162. Moreover, a first insulating plate 17 is interposed between the back plate 11 and the circuit substrate 12, and a second insulating plate 18 is interposed between the circuit substrate 12 and the fixing element 15. After the fastening elements 162 are screwed in corresponding fastening holes 161, the stress sensor 10 is assembled.

The pointing operation element 13 is disposed on an upper surface 121 of the circuit substrate 12. The stress sensitive resistors 14 are disposed on a lower surface 122 of the circuit substrate 12, in which the lower surface 122 is opposite to the upper surface 121. The stress sensitive resistors 14 include vertical stress sensitive resistors 141 and 142 for sensing vertical orientation forces and the horizontal stress sensitive resistors 143 and 144 for sensing horizontal orientation forces. When the pointing operation element 13 is pushed in a desired direction by a single finger of the user, a stress deformable region 123 of the circuit substrate 12, which is coupled to the bottom of the pointing operation element 13, will be subject to deformation in the vertical or horizontal direction. According to deformation of the stress sensitive resistors 14 within the stress deformable region 123, the resistance values of the stress sensitive resistors 14 will change. According to a resistance change is detected by a microprocessor or a controller (not shown) which is connected to the stress sensor 10, corresponding movement of the cursor on the display screen is rendered.

FIG. 3 is a schematic view illustrating the conventional stress sensor to be attached onto a keyboard body of an electronic device. For attaching the stress sensor 10 on the keyboard body 39, fastening elements 164 are screwed in corresponding fastening holes 163 of the fixing element 15. After the stress sensor 10 is mounted on the keyboard body 39, the overall height and the overall weight of the electronic device are increased and thus detrimental to minimization and light weightiness of the electronic device.

Therefore, there is a need of providing a stress sensor and an electronic device with such a stress sensor to obviate the drawbacks encountered from the prior art.

SUMMARY OF THE INVENTION

It is an object of the present invention to provide a stress sensor to be attached onto an electronic device without considerably increasing the overall height or volume of the electronic device.

Another object of the present invention provides an electronic device having a stress sensor with a reduced height or volume.

In accordance with an aspect of the present invention, there is provided a stress sensor. The stress sensor includes a circuit substrate and a pointing operation element. The circuit substrate has a stress sensing structure. The pointing operation element is disposed on a surface of the circuit substrate and connected to the stress sensing structure. The circuit substrate is combined with an assembled object of an input unit by a connecting mechanism such that the circuit substrate is directly attached onto a surface of the assembled object.

In an embodiment, the stress sensing structure includes a stress deformable region coupled to the pointing operation element and a plurality of stress sensitive resistors within the stress deformable region.

In an embodiment, the input unit is a hardware input structure of an electronic device selected from a notebook computer, a mouse, a keyboard, a hand-held device or a joystick for inputting instructions therevia, and the assembled object is a structural element or a component of the hardware input structure.

In an embodiment, the input unit is a hardware input structure of a keyboard, and the assembled object is a keyboard body with an upper surface and a lower surface.

In an embodiment, the pointing operation element is disposed on an upper surface of the circuit substrate. A lower surface of the circuit substrate is attached onto the upper surface of the keyboard body by the connecting mechanism. Alternatively, the keyboard body further comprises a hollow portion such that the pointing operation element penetrates through the hollow portion and the upper surface of the circuit substrate is attached onto the lower surface of the keyboard body by the connecting mechanism.

In an embodiment, the connecting mechanism includes multiple fastening elements and corresponding fastening holes formed in the circuit substrate and the keyboard body. Alternatively, the connecting mechanism includes a viscose or a hot melt adhesive to bond the circuit substrate onto the keyboard body.

In an embodiment, the stress sensor further includes a first insulating plate interposed between the circuit substrate and the keyboard body.

In an embodiment, the circuit substrate is attached onto the upper surface of the keyboard body, and the stress sensor further includes a fixing element with another hollow portion such that the pointing operation element penetrates through the another hollow portion and the fixing element is attached onto the upper surface of the circuit substrate.

In an embodiment, the stress sensor further includes a second insulating plate interposed between the fixing element and the circuit substrate.

In an embodiment, the connecting mechanism includes multiple fastening elements and corresponding fastening holes formed in the circuit substrate and the keyboard body. Alternatively, the connecting mechanism includes a viscose or a hot melt adhesive to bond the fixing element, the circuit substrate and the keyboard body together.

In an embodiment, the circuit substrate is attached onto the lower surface of the keyboard body, and the stress sensor further includes a back plate attached onto the lower surface of the circuit substrate.

In an embodiment, the stress sensor further includes a third insulating plate interposed between the back plate and the circuit substrate.

In an embodiment, the connecting mechanism includes multiple fastening elements and corresponding fastening holes formed in the back plate, the circuit substrate and the keyboard body so as to combine the back plate, the circuit substrate and the keyboard body together. Alternatively, the connecting mechanism comprises a viscose or a hot melt adhesive to bond the back plate, the circuit substrate and the keyboard body together.

In accordance with another aspect of the present invention, there is provided an electronic device with a stress sensor. The electronic device includes the stress sensor, an assembled object and a connecting mechanism. The stress sensor includes a circuit substrate and a pointing operation element. The circuit substrate has a stress sensing structure. The pointing operation element is disposed on a surface of the circuit substrate and connected to the stress sensing structure. The connecting mechanism is used for directly attaching the circuit substrate onto a surface of the assembled object.

In an embodiment, the electronic device is selected from a notebook computer, a mouse, a keyboard, a hand-held device or a joystick, and the electronic device has a hardware input structure for inputting instruction therevia.

In an embodiment, the assembled object is a structural element or a component of the hardware input structure.

In an embodiment, the electronic device is a keyboard, and the assembled object is a keyboard body.

In accordance with another aspect of the present invention, there is provided an electronic device with a stress sensor. The electronic device includes the stress sensor, an input unit and a connecting mechanism. The stress sensor includes a circuit substrate and a pointing operation element. The circuit substrate has a stress sensing structure. The pointing operation element is disposed on a surface of the circuit substrate and connected to the stress sensing structure. The input unit has an assembled body with an upper surface and a lower surface. The connecting mechanism is used for directly attaching the circuit substrate onto the upper surface or the lower surface of the assembled body.

In an embodiment, the input unit is a hardware input structure of an electronic device selected from a notebook computer, a mouse, a keyboard, a hand-held device or a joystick for inputting instructions therevia.

In an embodiment, the input unit is a hardware input structure of a keyboard, and the assembled body is a keyboard body.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In the following embodiments, the present is illustrated by referring to the configuration of a stress sensor and the connection between the stress sensor and a hardware input structure of an electronic device. Unless specifically stated, the operation principle of the stress sensor is substantially identical to that illustrated in the prior art and is not redundantly described herein.

Figure 1A:
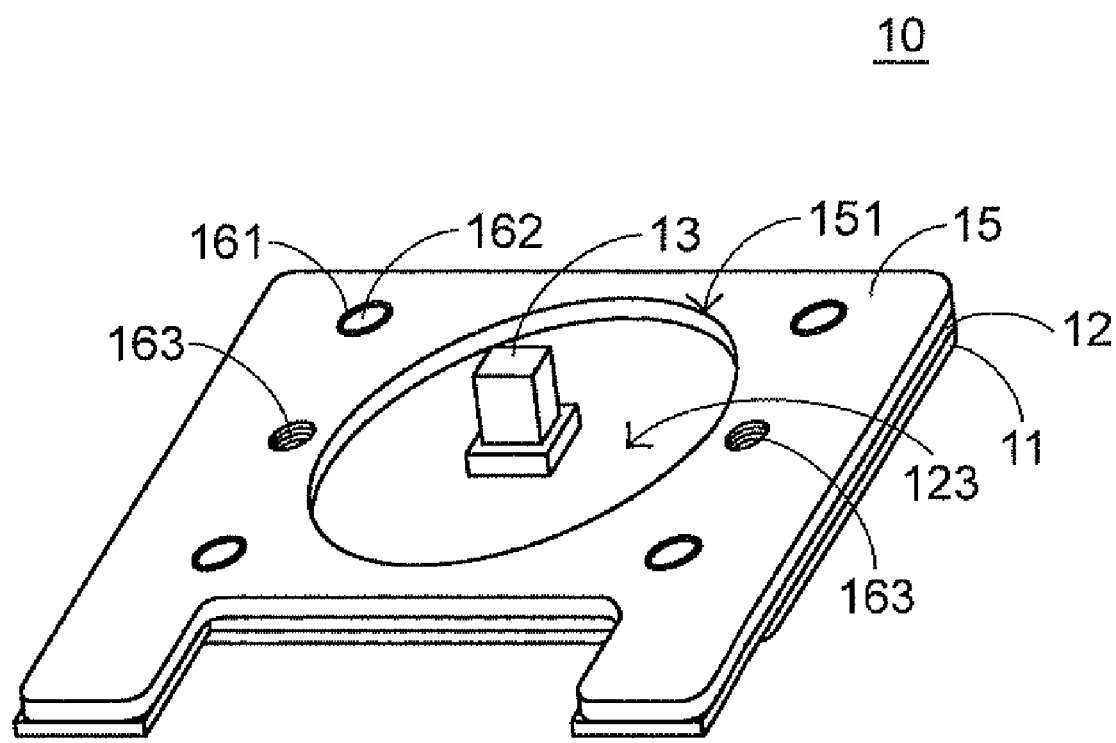
FIG. 1A is a schematic perspective view illustrating a conventional stress sensor.
Figure 4A:
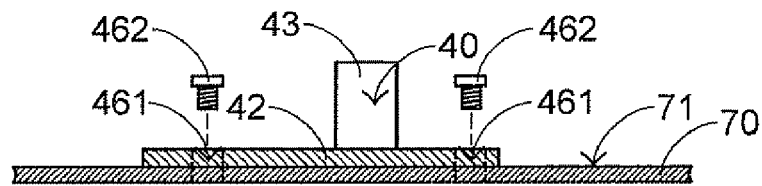
FIGS. 4A and 4B are schematic side views illustrating a stress sensor to be respectively attached onto upper and lower surfaces of an assembled object of an electronic device according to a first preferred embodiment of the present invention.
Figure 4B:
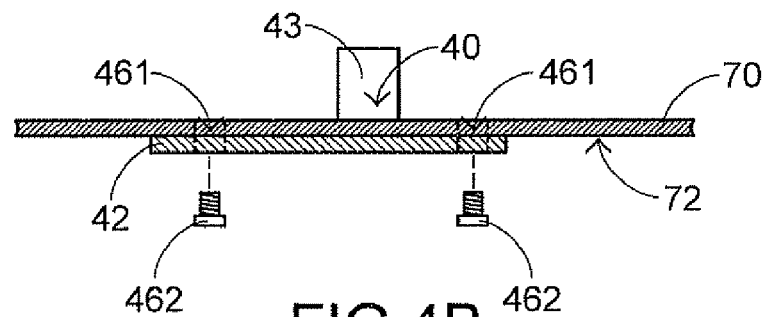

FIGS. 4A and 4B are schematic side views illustrating a stress sensor to be respectively attached onto upper and lower surfaces of an assembled object/body of an electronic device according to a first preferred embodiment of the present invention. As shown in FIGS. 4A and 4B, the stress sensor 40 principally comprises a circuit substrate 42 and a pointing operation element 43. The pointing operation element 43 is disposed on a surface (e.g. an upper surface) of the circuit substrate 42. In addition, the stress sensor 40 has a stress sensing structure (not shown). The stress sensing structure comprises a stress deformable region (not shown), which is coupled to the bottom of the pointing operation element 43, and a plurality of stress sensitive resistors within the stress deformable region. The details of the stress deformable region and the stress sensitive resistors are illustrated in FIGS. 1A, 1B and 2, and are not redundantly described herein.

The electronic device includes for example a notebook computer, a mouse, a keyboard, a hand-held device, a joystick, and the like. The electronic device has a hardware input structure (also referred as an input unit) for input instructions therevia. The assembled object/body is for example a structural element or a component of the electronic device. In a case that the electronic device is a keyboard for example, the assembled object/body to be combined with the stress sensor 40 is a keyboard body 70. In this embodiment, the assembled object/body is a keyboard body 70 with an upper surface 71 and a lower surface 72.

Please refer to FIG. 4A again. For attaching the stress sensor 40 onto the upper surface 71 of the keyboard body 70, fastening elements 462 are successively screwed in corresponding fastening holes 461 of the circuit substrate 42 and the keyboard body 70. Alternatively, the connecting mechanism comprises a viscose or a hot melt adhesive to bond the circuit substrate 42 and the keyboard body 70 together.

Figure 1B:
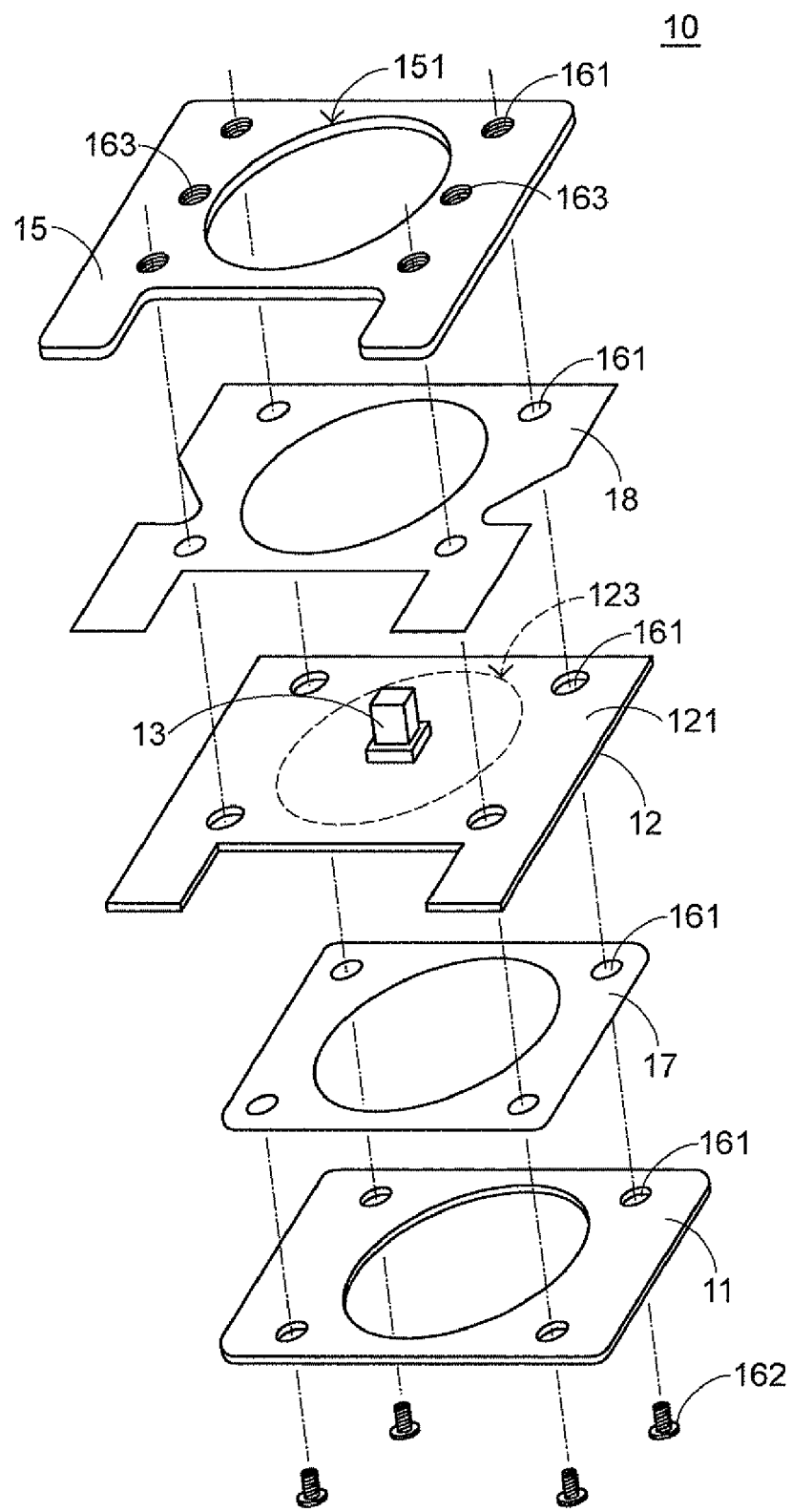
FIG. 1B is a schematic exploded view illustrating the conventional stress sensor of FIG. 1A.
Figure 2:
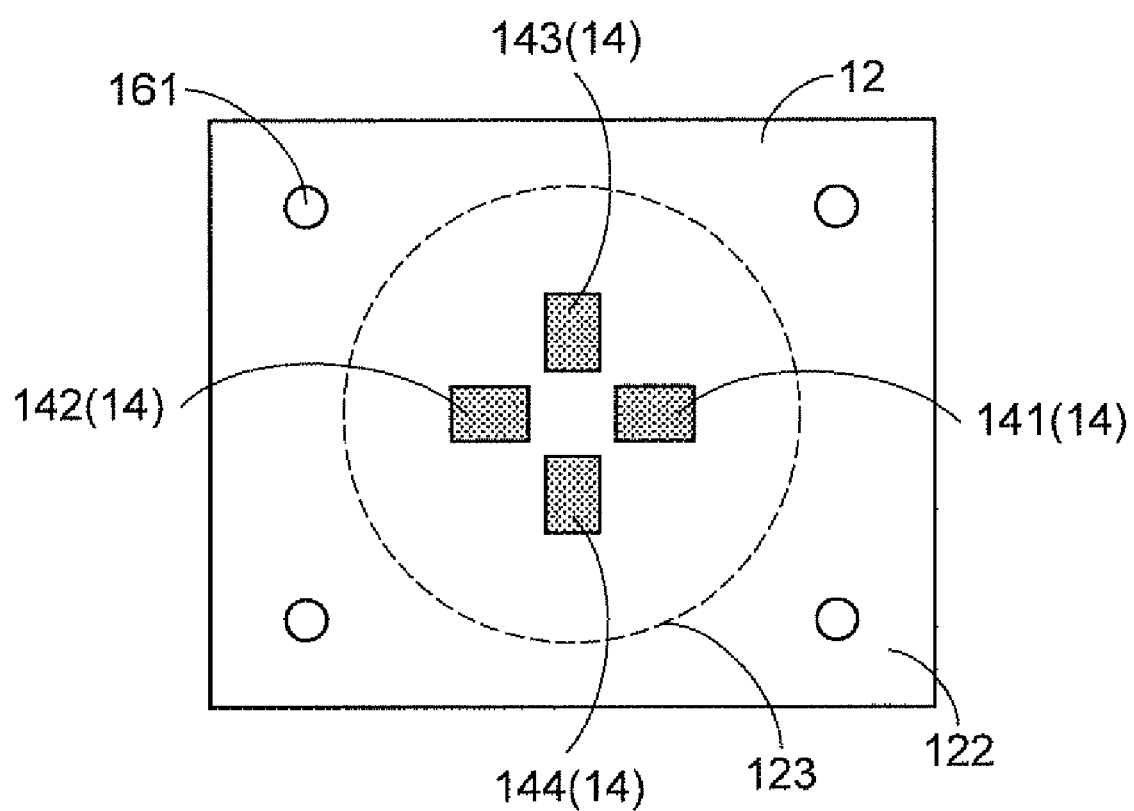
FIG. 2 schematically illustrates a lower surface of a circuit substrate used in the conventional stress sensor.
Figure 3:
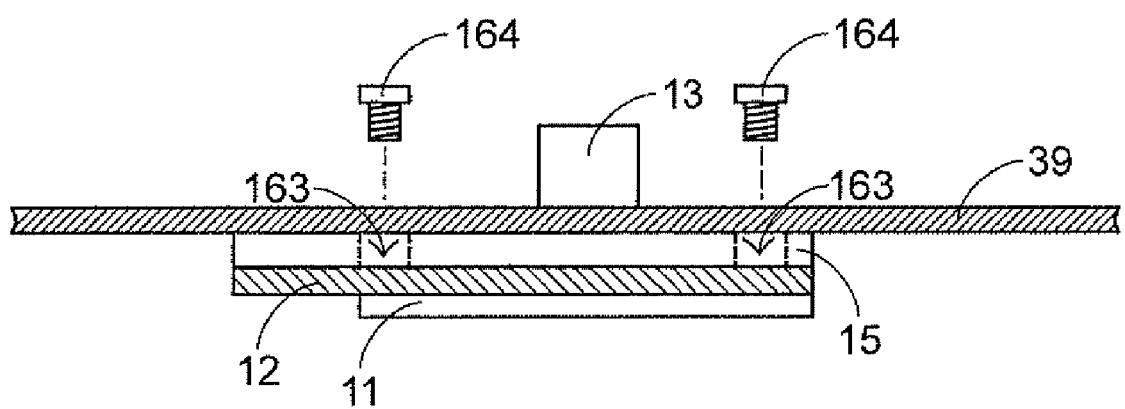
FIG. 3 is a schematic view illustrating the conventional stress sensor to be attached onto a keyboard body of an electronic device.

The stress sensor 40 can further include an insulating element such as the insulating plate 17 shown in FIG. 1B interposed between the circuit substrate 42 and the keyboard body 70.

Please refer to FIG. 4B again. For attaching the stress sensor 40 on the lower surface 72 of the keyboard body 70, the keyboard body 70 should has a hollow portion similar to the hollow portion 151 shown in FIG. 1B.

Figure 5:
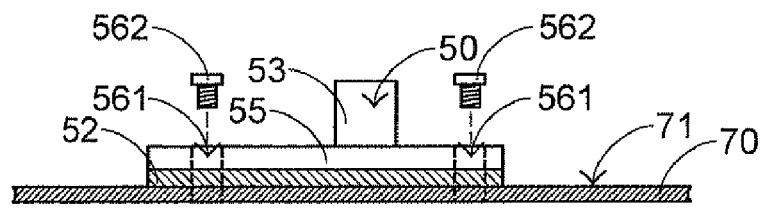
FIG. 5 is a schematic side view illustrating a stress sensor to be attached onto an upper surface of an assembled object of an electronic device according to a second preferred embodiment of the present invention.

As shown in FIG. 5, the stress sensor 50 principally comprises a circuit substrate 52, a pointing operation element 53 and a fixing element 55 with a hollow portion similar to the hollow portion 151 shown in FIG. 1B such that the pointing operation element 53 can penetrate therethrough. In some embodiment, the stress sensor 50 can further include an insulating element such as the insulating plate 18 shown in FIG. 1B and the insulating element is interposed between the circuit substrate 52 and the fixing element 55.

For attaching the stress sensor 50 on the upper surface 71 of the keyboard body 70, fastening elements 562 are successively screwed in corresponding fastening holes 561 of the fixing element 55, the circuit substrate 52 and the keyboard body 70. Alternatively, the fixing element 55 can be bonded onto the circuit substrate 52 and the circuit substrate 52 can be bonded onto the keyboard body 70 via a viscose or a hot melt adhesive.

Figure 6:
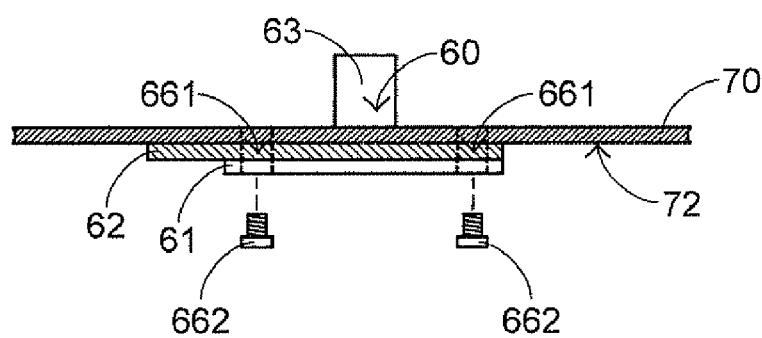
FIG. 6 is a schematic side view illustrating a stress sensor to be attached onto a lower surface of an assembled object of an electronic device according to a third preferred embodiment of the present invention.

As shown in FIG. 6, the stress sensor 60 principally comprises a circuit substrate 62, a pointing operation element 63 and a back plate 61. For attaching the stress sensor 60 on the lower surface 72 of the keyboard body 70, the keyboard body 70 should has a hollow portion similar to the hollow portion 151 shown in FIG. 1B such that the pointing operation element 63 can penetrate therethrough. As a consequence, the upper surface of the circuit substrate 62 can be attached onto the lower surface 72 of the keyboard body 70. Alternatively, the stress sensor 60 can be bonded on the lower surface 72 of the keyboard body 70 via a viscose or a hot melt adhesive so as to attach the stress sensor 60 on the lower surface 72 of the keyboard body 70. Besides, for example, the stress sensor 60 can further include an insulating element such as the insulating plate 17 shown in FIG. 1B and the insulating element is interposed between the circuit substrate 62 and the back plate 61.

Moreover, the connecting mechanism includes multiple fastening elements 662 and corresponding fastening holes 661 formed in the keyboard body 70, the circuit substrate 62 and the back plate 61 or a viscose and a hot melt adhesive to bond the keyboard body 70, the circuit substrate 62 and the back plate 61 together.

From the above description, the overall height of the stress sensor and the assembled object is reduced in comparison with the prior art. As a consequence, the present invention is advantageous for minimization of the electronic device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device with a stress sensor, said electronic device comprising:

said stress sensor comprising a circuit substrate and a pointing operation element, wherein said circuit substrate has a stress sensing structure disposed on a lower surface thereof, said stress sensing structure comprises a stress deformable region and a plurality of stress sensitive elements within said stress deformable region, output of the stress sensitive elements are changed corresponding to deformation of the stress deformable region, and said pointing operation element is disposed on an upper surface of said circuit substrate;

an assembled object; and a connecting mechanism for directly attaching said circuit substrate onto a lower surface of said assembled object;

wherein said assembled object further comprises a hollow portion such that said pointing operation element penetrates through said hollow portion and the upper surface of said circuit substrate is attached onto the lower surface of said assembled object by said connecting mechanism.

2. The electronic device according to claim 1 wherein said stress sensitive elements are stress sensitive resistors, said electronic device is selected from a notebook computer, a mouse, a keyboard, a hand-held device or a joystick, said electronic device has a hardware input structure for inputting instruction therevia, and said assembled object is a structural element or a component of said hardware input structure.

3. The electronic device according to claim 2 wherein said connecting mechanism comprises multiple fastening elements and corresponding fastening holes formed in said circuit substrate and said keyboard body so as to combine said circuit substrate and said keyboard body together, or said connecting mechanism comprises a viscose or a hot melt adhesive to bond the circuit substrate onto said keyboard body, and said stress sensor optionally comprises a first insulating plate interposed between said circuit substrate and said assembled object.

4. The electronic device according to claim 2 wherein said stress sensor further comprises a back plate attached onto said lower surface of the circuit substrate, and said stress sensor optionally comprises a second insulating plate interposed between said back plate and said circuit substrate, wherein said connecting mechanism comprises multiple fastening elements and corresponding fastening holes formed in said back plate, said circuit substrate and said assembled object so as to combine said back plate, said circuit substrate and said assembled object together.

5. An electronic device with a stress sensor, said electronic device comprising:

said stress sensor comprising a circuit substrate and a pointing operation element, wherein said circuit substrate has a stress sensing structure disposed on a lower surface thereof, said stress sensing structure comprises a stress deformable region and a plurality of stress sensitive elements within said stress deformable region, output of the stress sensitive elements are changed corresponding to deformation of the stress deformable region, and said pointing operation element is disposed on an upper surface of said circuit substrate and connected to said stress sensing structure;

an input unit having an assembled body with a hollow portion, an upper surface and a lower surface, wherein the pointing operation element penetrating through the hollow portion of the assembled object; and a connecting mechanism for directly attaching said upper surface of said circuit substrate onto said lower surface of said assembled object.

6. The electronic device according to claim 5 wherein said stress sensitive elements are stress sensitive resistors, said input unit is a hardware input structure of an electronic device selected from a notebook computer, a mouse, a keyboard, a hand-held device or a joystick for inputting instructions therevia.

7. The electronic device according to claim 6 wherein said input unit is said keyboard, said assembled body is a keyboard body, and said pointing operation element is disposed on the upper surface of said circuit substrate.

8. The electronic device according to claim 7 wherein said connecting mechanism comprises multiple fastening elements and corresponding fastening holes formed in said circuit substrate and said keyboard body so as to combine said circuit substrate and said keyboard body together, said stress sensor optionally comprises a first insulating plate interposed between said circuit substrate and said keyboard body.

9. The electronic device according to claim 7 wherein said stress sensor further comprises a back plate attached onto said lower surface of the circuit substrate, and said stress sensor optionally comprises a second insulating plate interposed between said back plate and said circuit substrate, wherein said connecting mechanism comprises multiple fastening elements and corresponding fastening holes formed in said back plate, said circuit substrate and said keyboard body so as to combine said back plate, said circuit substrate and said keyboard body together.

* * * * *